United States Patent
Whisler

[15] 3,690,720
[45] Sept. 12, 1972

[54] VEHICLE CAB AND SAFETY FRAME ASSEMBLY

[72] Inventor: Edwin Lee Whisler, Dubuque, Iowa

[73] Assignee: Deere & Company, Maline, Ill.

[22] Filed: July 27, 1970

[21] Appl. No.: 58,258

[52] U.S. Cl..............296/28 C, 280/150 C, 296/35 R
[51] Int. Cl. ...........................................B62d 27/04
[58] Field of Search ...296/28 C, 35, 102; 280/150 C; 180/89

[56] References Cited

UNITED STATES PATENTS

| | | | |
|---|---|---|---|
| 2,805,887 | 9/1957 | Selby | 296/102 |
| 3,420,568 | 1/1969 | Henriksson et al. | 296/35 R |
| 3,438,672 | 4/1969 | Gipp | 296/35 R |
| 3,306,625 | 2/1967 | Ottosson | 280/150 C |

FOREIGN PATENTS OR APPLICATIONS 1,170,240  11/1969  Great Britain............296/28 C

*Primary Examiner*—Benjamin Hersh
*Assistant Examiner*—Leslie J. Paperner
*Attorney*—H. Vincent Harsha, Harold M. Knoth, William A. Murray, John M. Nolan and Raymond L. Hollister

[57] ABSTRACT

A vehicle cab and a safety frame are constructed as separate units. The safety frame is rigidly fixed to the vehicle frame and the cab is secured to the safety frame by resilient mount assemblies which isolate the cab from the ordinary flections and vibrations of the safety frame. Four resilient mount assemblies are used to suspend substantially the entire weight of the cab from upper structural members of the safety frame and a pair of resilient mounts are used to anchor the cab to lower structural members of the safety frame. The upper and lower resilient mount assemblies cooperate to limit lateral and fore-and-aft movements of the cab.

2 Claims, 6 Drawing Figures

INVENTOR.
E. L. WHISLER

PATENTED SEP 12 1972 3,690,720

INVENTOR.
E. L. WHISLER 3,690,720

VEHICLE CAB AND SAFETY FRAME ASSEMBLY

BACKGROUND OF THE INVENTION

Vehicle manufacturers have lately devoted much attention to operator comfort and safety. As a result, it is becoming common practice to provide vehicles, such as tractors, with both a cab and a safety frame.

In some instances, the cabs and safety frames have been manufactured as integral units. These units have not proved to be entirely satisfactory since they must be secured to the tractor frame by special connections which are rigid and strong enough to properly serve the safety frame aspect of the unit, while at the same time being resilient enough to isolate vibrations so as to serve the cab aspect of the unit. These two desirable features are oftentimes not suitably balanced and/or the connections are relatively expensive. Also, some integral units have been designed such as to require seals between the cab and safety frame portions, which seals are difficult to install, resulting in increased assembly costs.

In other instances, cab and safety frames have been constructed as separate entities. In order to judiciously use available mounting space on the vehicle frame, the structural members of the cabs and safety frames have of necessity been disposed in relatively close proximity to each other and as a result the members often come into contact with each other during operation of the vehicle causing undue wear and noise. Attempt has been made to circumvent this problem by specially constructing the cab so that interference between the cab and safety frame is prevented; however, this special construction again results in increased assembly costs.

SUMMARY OF THE INVENTION

According to the present invention, there is provided a cab and safety frame assembly which is relatively simple and inexpensive.

It is an object of the invention to provide a cab and a safety frame which are manufactured as separate units and which are easily secured together when mounted on a vehicle.

Another object is to provide a safety frame which is rigidly secured to a vehicle frame and to provide a cab which is secured to the safety frame by a plurality of resilient mount assemblies for isolating the cab from vibrations and flections undergone by the safety frame.

A more specific object is to provide a cab having the weight thereof substantially supported by four resilient mount assemblies secured to the upper members of the safety frame, and to provide a pair of resilient mount assemblies secured to the lower members of the safety frame to cooperate with the upper resilient mount assemblies to prevent undue fore-and-aft and sideways movements of the cab.

These and other objects will become apparent from the ensuing description and appended drawings.

BRIEF DESCRIPTION OF THE DRAWINGS

FIG. 5 is an enlarged side view, partially broken away and partially in section, of one of the lower connections between the cab and the safety frame.

FIG. 6 is a view similar to Fig. 5, but showing one of the upper connections between the cab and safety frame.

DESCRIPTION OF THE PREFERRED EMBODIMENT

Preliminarily, it should be noted that the logging vehicle with which the present invention is shown associated forms no part of the present invention, and is illustrated merely as being representative of the many industrial and agricultural tractors with which the present invention may be used.

Figure 1:
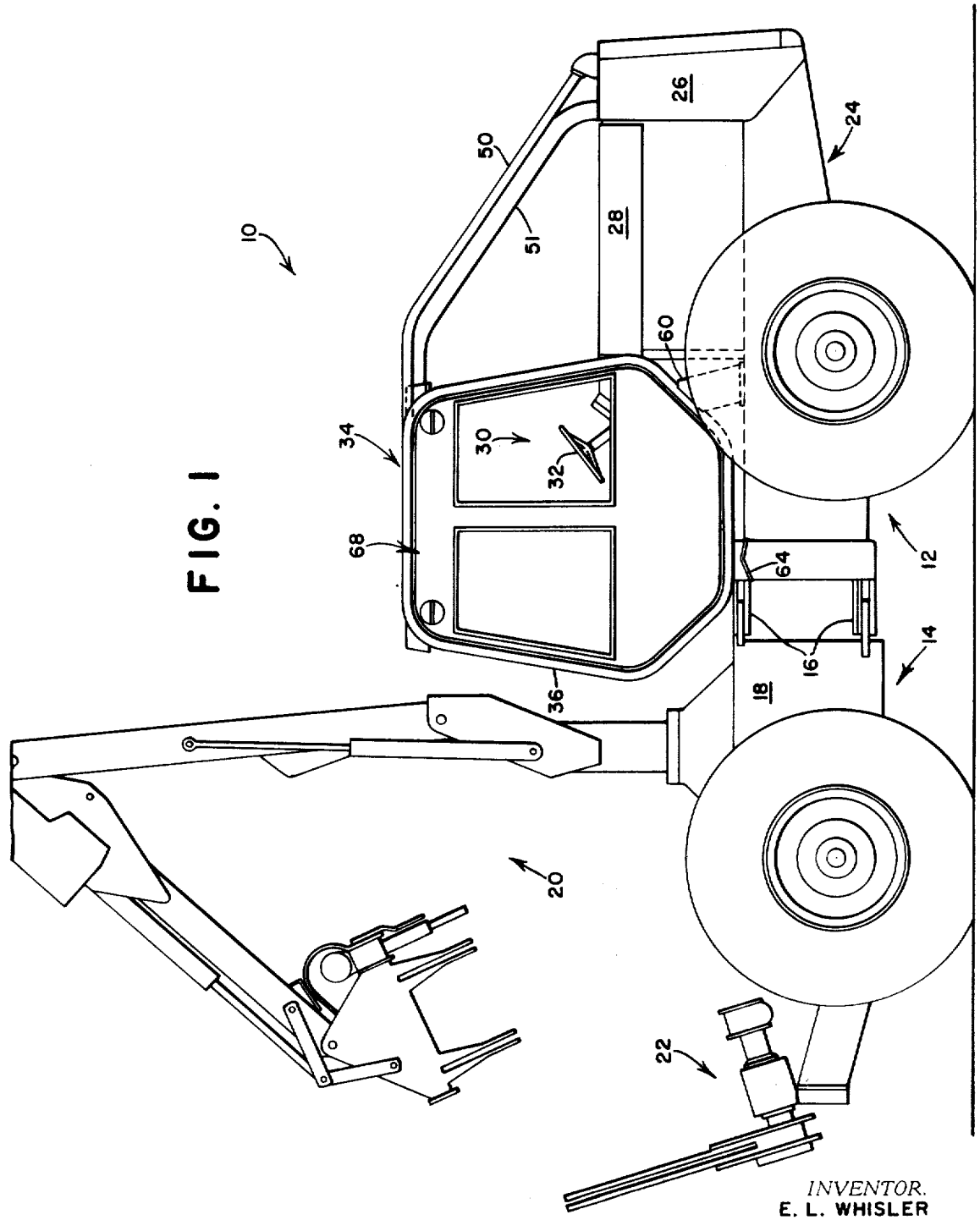
FIG. 1 is a side elevational view of a logging vehicle on which a cab and safety frame assembly constructed according to the principles of the invention, is mounted.
Figure 2:
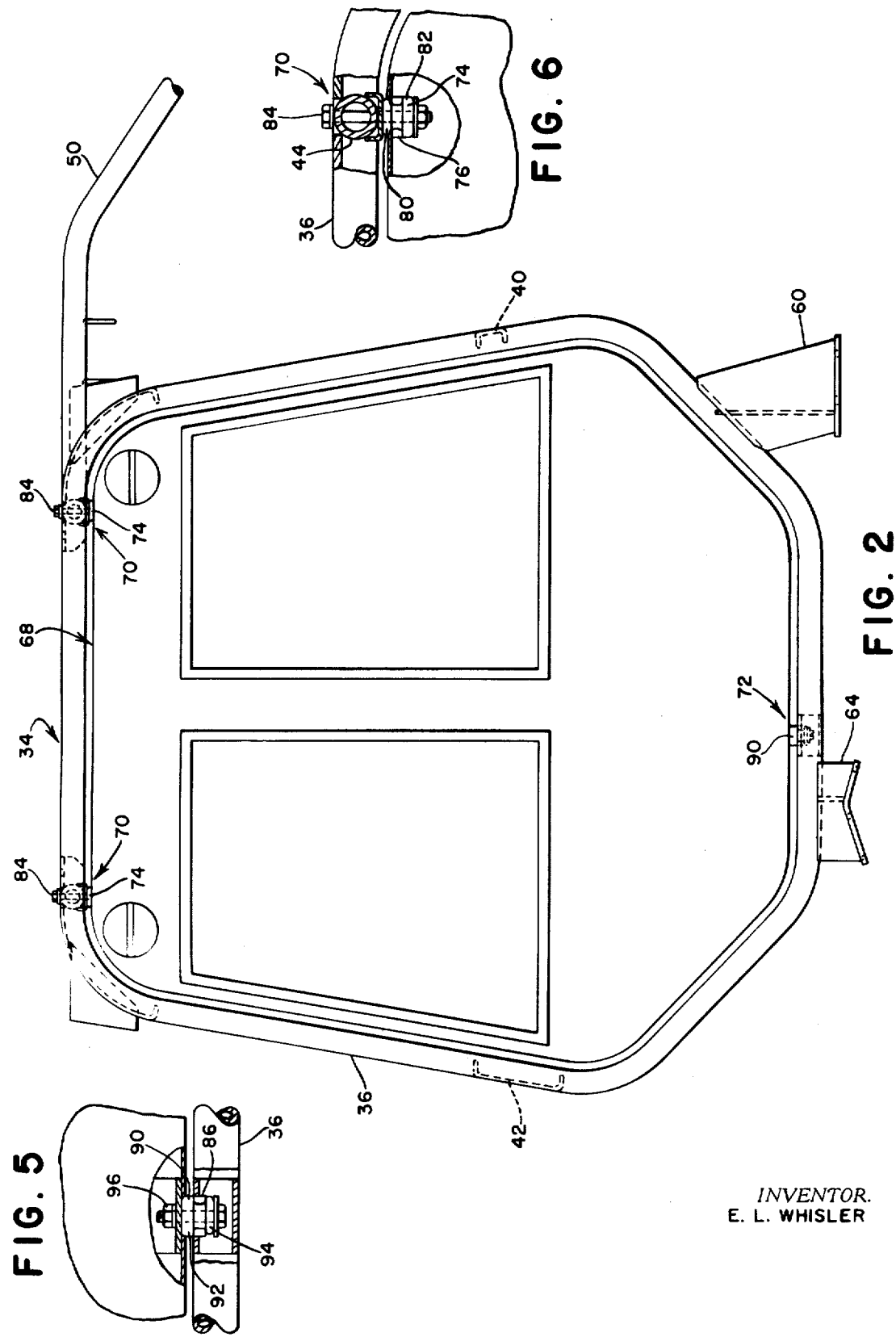
FIG. 2 is a side elevational view of the cab and safety frame assembly shown dismounted from the vehicle.
Figure 3:
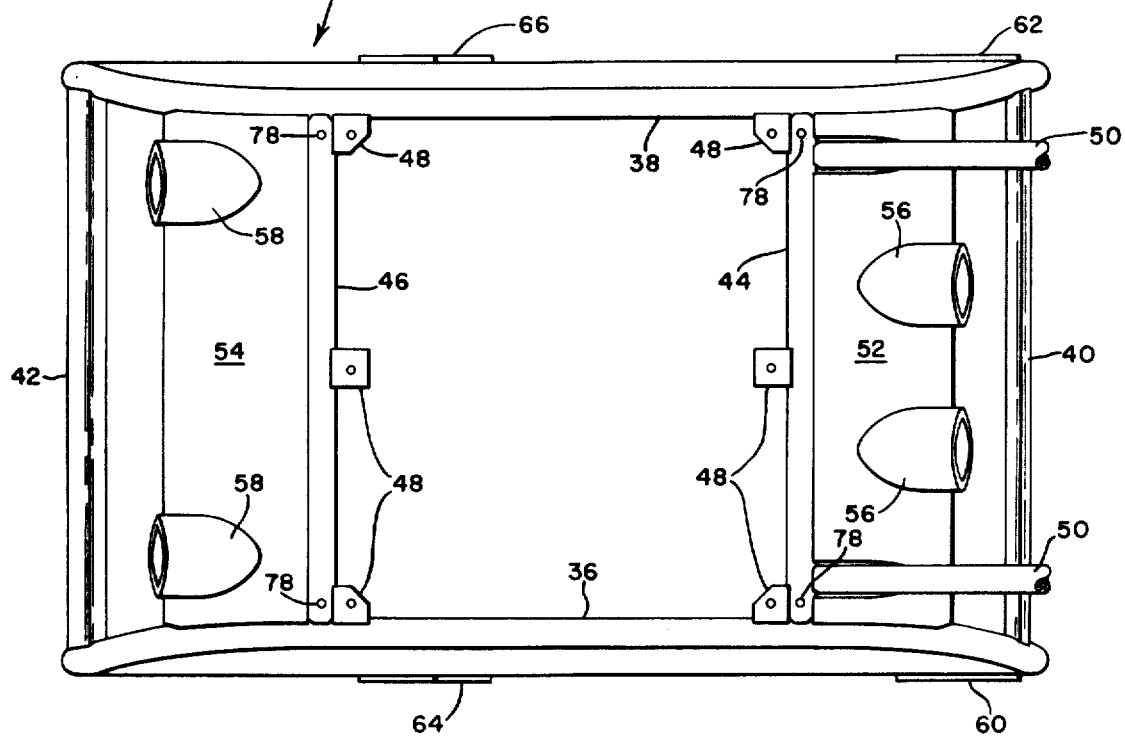
FIG. 3 is a top view of the safety frame shown in Fig. 2.
Figure 4:
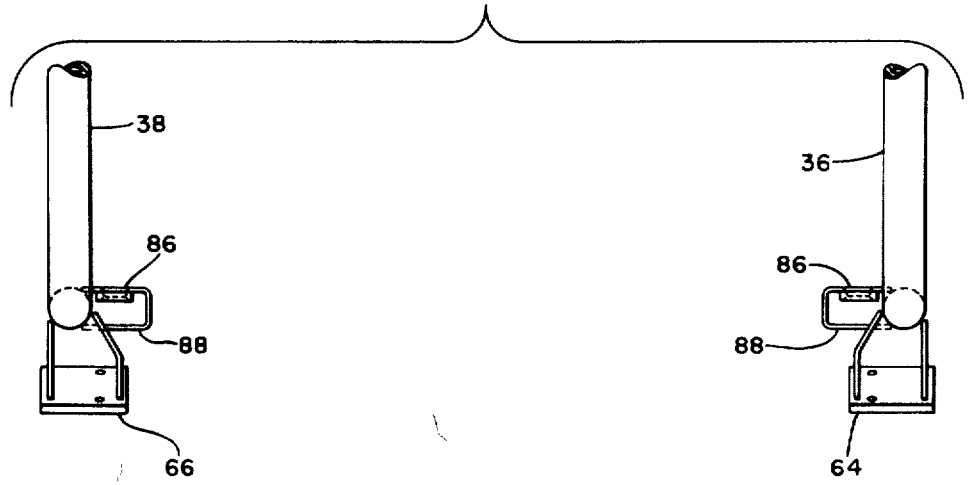
FIG. 4 is a partial rear elevational view of the safety frame showing the support brackets for the bottom of the cab.

Referring now to Fig. 1, there is shown a typical logging vehicle indicated in its entirety by the numeral 10. The vehicle 10 includes a forward two-wheel tractor portion 12 and a rearward two-wheel trailer portion 14 interconnected by a vertical pivot structure 16. The trailer portion 14 includes a frame 18 on which is mounted a shear assembly 20 for felling trees, and an accumulator assembly 22 for holding trees to be skidded. Since the trailer portion 14 is in no way connected with the present invention, it will not be discussed further.

The tractor portion 12 includes a main longitudinal frame 24 having an upright radiator housing 26 fixed at its forward end. Behind the housing 26 is an engine hood 28, and behind the hood 28 is an operator's zone 30 where the controls for the vehicle 10 are located. For the sake of simplicity, the only control shown in the zone 30 is a steering wheel 32.

A safety frame 34 is provided to protect an operator positioned in the zone 30 from being injured, for example, by falling trees or as a result of an upset. The safety frame 34 is an open framework constructed, for the most part, of a plurality of tubular structural members, and includes laterally spaced similar sides 36 and 38, which are hexagonal in side view and are interconnected at their forward and rearward sides, respectively, by transverse channel members 40 and 42, and are interconnected at their tops by transverse forward and rearward tubular cross members 44 and 46, respectively. A plurality of apertured tabs 48 are fixed along and at opposed locations on the cross members 44 and 46 and serve as means for the attachment of a wire mesh shield, or the like, (not shown). Attached adjacent the opposite ends of the forward cross member 44 are the rear ends of a pair of tubular braces 50 which extend forwardly and downwardly over opposite sides of the engine hood 28 and which have their forward ends secured to the radiator housing 26. An engine exhaust pipe 51 extends along and is partially protected by one of the braces 50. The corners between the adjacent sides of the respective frame sides 36 and 38 are arcuate, and the sides 36 and 38 are further interconnected by a pair of arcuate plates 52 and 54 which respectively extend between the forward and rearward upper corners of the sides 36 and 38, and which respectively serve as supports for a pair of forwardly directed lights 56 and a pair of rearwardly directed lights 58. The safety frame 34 is fixedly secured to the frame 24 by means of a forward pair of brackets 60 and 62 and a rearward pair of brackets 64 and 66, one of each of the pairs of brackets being respectively integral with the bottom of the sides 36 and 38 and being fastened to the frame 24 by bolts (not shown).

A cab 68 is positioned generally within the confines of the safety frame 34. The cab 68 is hexagonal in side view and is dimensioned so as to be easily passed through the hexagonal opening delimited by the sides 36 and 38 of the safety frame 34. The cab 68 is interconnected with the safety frame 34 by four upper resilient mount assemblies 70 and by a pair of lower resilient mount assemblies 72. The upper mount assemblies 70 include resilient inserts 74 which are received in sockets 76 fixed to the ceiling of the cab 68 in axial alignment with apertures 78 in the end portions of the tubular cross members 44 and 46. The resilient inserts 74 include upper and lower heads 80 and 82 which respectively underlie the sockets 76 and overlie the top of the cab 68. The inserts 74 are held in place by bolts 84 which extend through the apertures 76. The lower resilient mount assemblies 72 include a pair of sockets 86 carried by a pair of U-shaped brackets 88 fixed to the sides 36 and 38 at oppositely disposed locations on the lower portions thereof. Resilient inserts 90 are disposed in the sockets 86 and include upper and lower heads 92 and 94 which respectively overlie the brackets 88 and underlie the sockets 86. A pair of apertures (not shown) in the floor of the cab 68 are aligned with the sockets 86 and bolts 96 extend through the apertures and hold the inserts 90 in place.

When the cab 68 is properly connected to the safety frame 34, the upper mount assemblies 70 will support substantially the entire weight of the cab, and the lower mount assemblies 72 will cooperate with the upper mount assemblies 70 to limit fore-and-aft and sideways movements of the cab 68. Further, the mount assemblies 70 and 72 will, through means of their respective resilient inserts 74 and 90, isolate the cab 68 from the ordinary vibrations and flections of the safety frame 34.

The safety frame 34 is constructed such that it may be completely mounted on the frame 24 independently of the cab 68 and is constructed such that the cab 68 may be inserted thereunder by passing the cab through the opening delimited by the sides 36 and 38.

I claim:

1. In a vehicle having a frame means including a safety frame including upper and lower portions and a cab enclosed by the safety frame, the improvement comprising: said safety frame including a pair of laterally spaced side members respectively including first portions extending fore-and-aft above the opposite sides of the cab and second portions extending fore-and-aft below the opposite sides of the cab; and resilient mount means connecting the cab to said upper and lower portions of the safety frame.

2. The invention defined in claim 1 wherein said safety frame includes a pair of laterally spaced sides extending completely around said cab as viewed in side view.

* * * * *